United States Patent [19]

Lamort

[11] Patent Number: 4,838,301
[45] Date of Patent: Jun. 13, 1989

[54] DRAINING VALVE FOR WASTE PAPER PROCESSING APPLIANCES

[75] Inventor: Jean-Pierre Lamort, Vitry Le François, France

[73] Assignee: E & M Lamort, France

[21] Appl. No.: 150,378

[22] Filed: Jan. 29, 1988

[30] Foreign Application Priority Data

Jan. 30, 1987 [FR] France ............................ 87 01139

[51] Int. Cl.⁴ .................. F16K 3/00; F16K 31/122; B08B 3/04
[52] U.S. Cl. ........................ 137/240; 134/166 R; 251/328; 251/329
[58] Field of Search ................. 137/238, 240; 134/166 R, 166 C, 167 R, 167 C, 172; 251/62, 63, 326, 327, 328, 329

[56] References Cited

U.S. PATENT DOCUMENTS

| 30,611 | 11/1860 | Bristol | 251/329 |
| 982,036 | 1/1911 | Collar | 251/326 |
| 2,631,759 | 3/1953 | Hoopes | 137/240 |
| 3,918,471 | 11/1975 | Bedner | 137/240 |
| 3,976,094 | 8/1976 | Jandrasi et al. | 137/240 |
| 4,174,728 | 11/1979 | Usnick et al. | 137/240 |
| 4,220,269 | 9/1980 | Beckers et al. | 251/326 |
| 4,292,992 | 10/1981 | Bhide' | 137/240 |
| 4,383,546 | 5/1983 | Walters, Jr. | 137/240 |
| 4,402,337 | 9/1983 | Schuurman | 137/240 |
| 4,524,796 | 6/1985 | Ayers, Jr. et al. | 137/240 |

FOREIGN PATENT DOCUMENTS

1600753 1/1970 Fed. Rep. of Germany ...... 251/326

Primary Examiner—George L. Walton
Attorney, Agent, or Firm—Darby & Darby

[57] ABSTRACT

A valve arrangement has an outflow seat section defined by at least a tubular side wall. The outflow seat section has a free end with an engaging part extending along the entire periphery of the side wall. The engaging part is adapted for close engagement with an engaging surface of a movable obturating plate. The engaging surface is substantially parallel to a plane of the engaging part and remains substantially parallel to this plane during movement of the obturating plate toward and from the free end of the outflow seat section. During operation of the valve arrangement the engaging surface of the obturating plate simultaneously engages the entire plane of the engaging part of the outflow seat section causing closing of the valve arrangement.

17 Claims, 2 Drawing Sheets

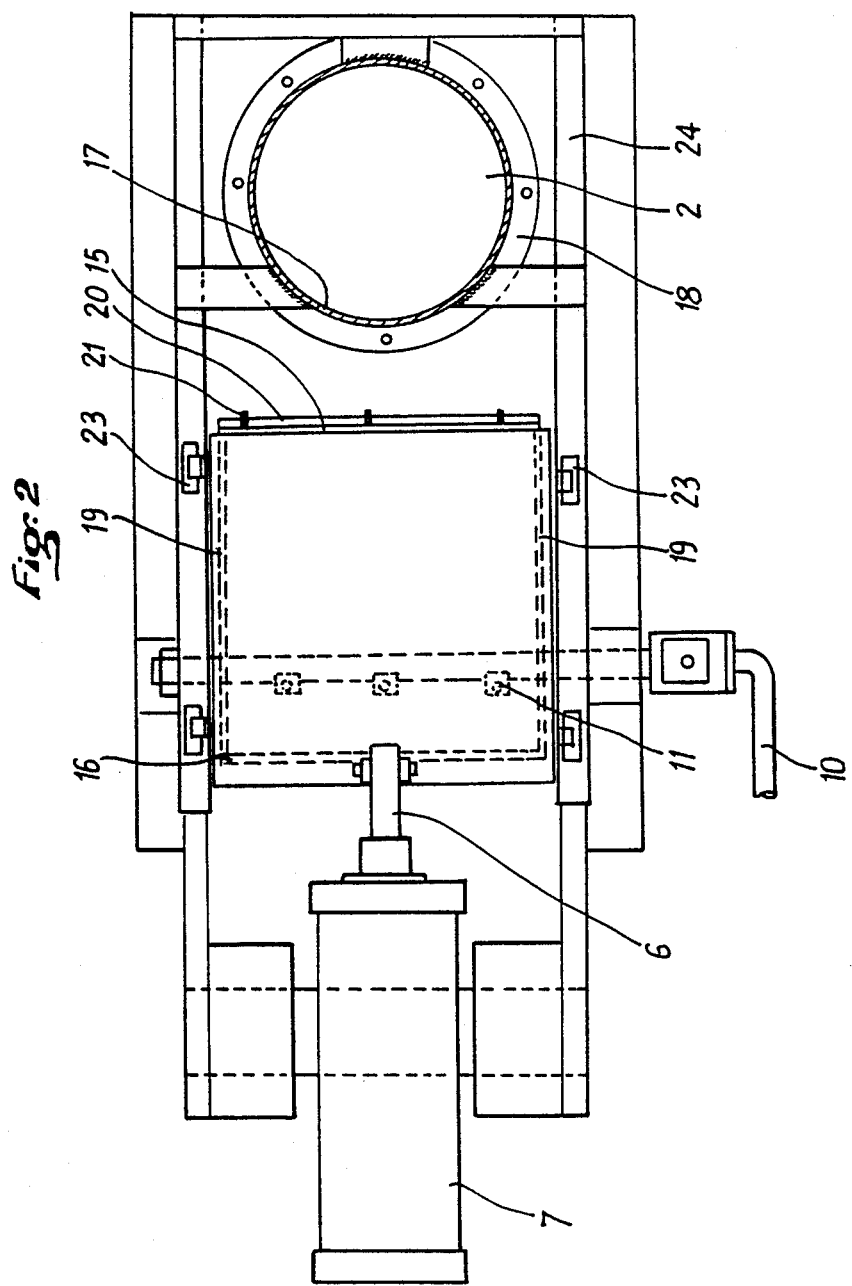

DRAINING VALVE FOR WASTE PAPER PROCESSING APPLIANCES

This invention relates to draining valves for waste paper processing equipment.

BACKGROUND OF THE INVENTION

The recycling of waste paper represents a large fraction in paper production, and the presence of impurities or contaminants mixed with the waste paper, for instance bulky or metallic objects, plastics, etc ..., gives rise to important problems, particularly at the level of the discharge valves of the devices located in the first processing stages where waste paper is converted into a coarse pulp.

The coarser impurities are eliminated during these first stages, generally through processes which operate discontinuously, product flow being controlled by means of valves: for instance, the valve is opened for allowing impurities to flow out, and is thereafter closed back for carrying out a new processing cycle.

These valves are usually of the slide-valve type called "shovel sluice" or "traversing scoop" or "guillotine" which allows for a quick opening or closing of the duct being controlled. However, when contaminants are evacuated from an apparatus, either for being rejected to the exterior or else for being washed in another apparatus, some of them will become lodged inside the valve slide or else will become jammed in the opening passage of the valve (metal rods or other bulky items), or again they will distort the tip of the "shovel" at the moment of closing, thus preventing it from operating correctly afterwards. Also, salts which are abundantly present in processing water give rise to an important corrosion of the "scoops", even when these are made of stainless steel, so that they become jammed or seized. These breakdowns and damages result in stoppages in the operation of the plant, with important losses of products and severe pollution problems.

SUMMARY OF THE INVENTION

The invention has the purpose of overcoming these drawbacks and has as its object a draining valve for a waste paper processing apparatus comprising a gravity draining orifice, characterized in that, in combination :
- the plane of the outflow section of the orifice is inclined by an angle $\alpha$ relatively to the horizontal, and it comprises :
- a rigid mobile obturating plate, inclined by an angle $\alpha$ relatively to the horizontal, having dimensions at least equal to those of the outflow section of the orifice, said plate being intended for pressing against the edges of said orifice for obturating it and for shutting the valve,
- linked to said plate, a means for moving said plate, such as a pneumatic jack or similar, so that under the action of said means the plate will move for opening the valve in a direction which is simultaneously extending away from the orifice along an axis perpendicular to the plane of the outflow section and extending away from the duct perpendicularly to said axis and will move for closing the valve in the opposite direction while the slant $\alpha$ of the plate will remain constant, at least in the immediate proximity of the orifice,
- a water feed line provided with at least one spray nozzle or similar device for spraying water onto the plate while the valve is open.

The draining valve according to this invention is further characterized by the following features:
- the draining outlet of the apparatus is provided with a duct which is integral with the apparatus and it comprises an adapting flange. The valve comprises on its upper side a duct provided on its upper end with a flange intended for being assembled with the adapting flange and presenting on its lower end a cylindrical end portion having an inclined outflow section.
- the obturating plate comprises:
- on its posterior end, an edge bent upwards, and, on its sides, edges bent upwards, these edges being intended for preventing splashing towards the exterior, particularly at the time of opening the valve, and to increase the stiffness of the plate;
- on its top surface, a simple coating of rubber or the like, intended for providing a proper closing, a proper tightness of the valve, and protection thereof against corrosion. This coating is held onto the plate along its leading and trailing edges.
- displacement rollers which are mobile along rolling and guiding rails, said rails being fixed relatively to the inclined outflow section; said rails are rigidly fixed with the upper duct of the valve.
- it comprises a sensor for detecting the presence of the obturating plate in its open valve position, said sensor being connected to the water feed system of the spray nozzles.
- angle $\alpha$ is comprised between 3° and 30°.

The valve being thus constituted is freed at each opening of impurities which may have deposited on the periphery of the plate.

On another hand, in case of presence of a hard foreign body such as for instance a bar, the slant of the plate will cause that the bar will not be jammed so violently as it would be with a conventional slide valve.

DESCRIPTION OF THE DRAWINGS

For a better understanding of the invention, there is represented in the appended drawing :

FIG. 2, a diagrammatic view of the valve of FIG. 1 seen from below.

DETAILED DESCRIPTION

Figure 1:
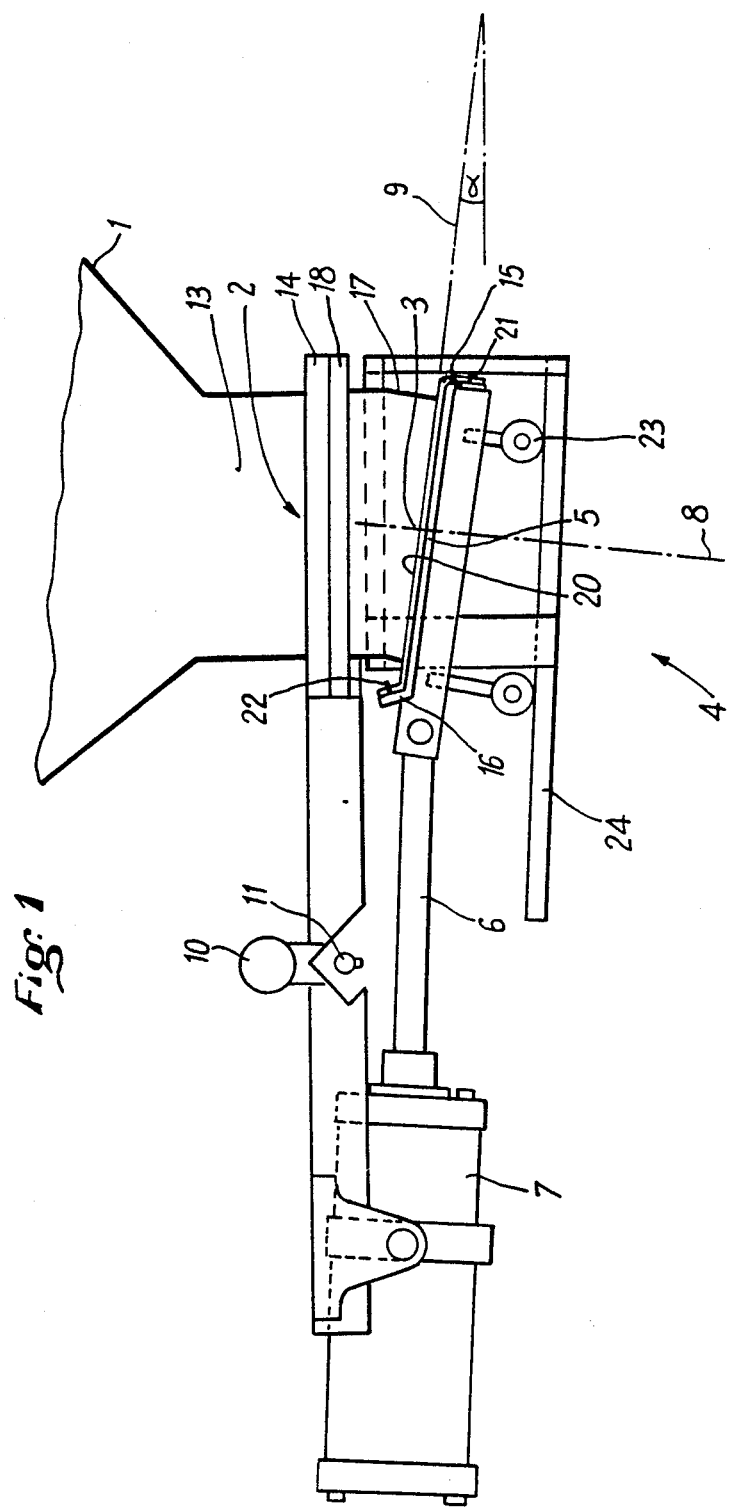
FIG. 1, a diagrammatic profile view of the draining valve according to the invention.

As shown in FIG. 1, the waste paper processing apparatus 1 comprises a gravity draining orifice 2. The plane of the outflow seat section 3 of orifice 2 is slanted by an angle $\alpha$ relatively to the horizontal. Valve 4 comprises a plane and rigid obturating plate 5 having dimensions at least equal to those of the outflow seat section 3, firmly mounted on the distal end of the stem 6 of an hydraulic jack 7 or any other equivalent displacement means, so that on the one hand when the jack 7 retracts, the plate 5 moves simultaneously longitudinally and transversally away from the outflow seat section 3, thus opening the draining orifice; when the jack 7 extends and pushes the stem 6, plate 5 moves in the opposite direction and draws closer to the outflow section. Also, during its displacement, the slant of the plate remains constant. Thus plate 5 does not slide transversally to orifice 2 against the plane of outflow seat section 3 as a slide valve would do, but it moves simultaneously along two directions; one direction along the axis 8 of the outflow (spacing movement) and one direction 9 perpendicular to said axis, along the plane of the section (plate withdrawal motion).

The slant angle is comprised between 3° and 30° and is preferably of the order of 8°. It is selected so that the component of gravity forces along the axis of the jack will be small relatively to the vertical component, so that the force to be provided by the jack for closing the valve will not need to be large. It is indeed important that the jack will not be liable to be suddenly pushed back, in case of a compressor breakdown. Conversely, if the angle were too small, this would result in excessive friction.

In the embodiment described as an example, the direction of the displacement imparted by the jack 7 is constant and the path is linear, but, according to the control device (connecting rods or other), the path of the plate may be curved, and the slant of the plate may vary; what is important is that the slant of the plate should remain constant while the plate is moving in the immediate vicinity of the orifice so that the plate will be either fully in contact and the orifice is then completely closed, or else it will not at all be in contact and the orifice will then be open.

The drawing shows also a device for washing plate 5. This device comprises a water feed line 10 and at least one spray nozzle 11 or the like, each of which sprays a jet towards plate 5 when said plate is in the most remote position away from the draining orifice 2 (position in which the valve 4 is open).

A sensor, not shown, for detecting the presence of the plate in this most distal position controls the water feed to the spray nozzles 11 so that when the valve is open and the plate is stationary, a jet of water will wash all its surface, thus removing any impurities which may have deposited thereon and reducing corrosion, particularly along the edges which provide the contact and the water-tightness.

Valve 4 being thus constituted makes it possible to open and to close orifice 2 without any rubbing of plate 5 against the end of this orifice, thus doing away with the jamming of conventional sliding plates in their slides.

Also, the displacement of the obturating plate 5 along a spacing direction and a transverse direction, and vice-versa, makes it possible to prevent a brutal jamming of impurities against the edge of the plate at the instant of closing: if an impurity is then present, caught between the edge of the plate and the edge of the orifice, it will be deformed around these respective edges without becoming jammed in the valve. For releasing this impurity, it will be sufficient to reopen the valve: either the impurity will simply drop out of the overflow section 3, or else it will be washed away from the plate 5 under the action of the water spray.

In a modified embodiment, the draining orifice 2 of the apparatus 1 comprises a duct 13 provided on its end with a flange 14. Under this duct 13 is placed another duct 17 comprising on one end a flange 18 designed for being fastened onto flange 14 and on the other end a cylindrical outflow portion having a circular section 3 inclined by an angle α, against which the obturating plate 5 will be pressed.

This duct 17 serves as an adaptation and mounting extension on the draining orifice 2.

The obturating plate 5 has its edges bent: the leading edge 15 is bent downwards, the trailing edge 16, at the rear, is bent upwards and the lateral edges 19 are also bent upwards in order to avoid projections of liquids towards the outside at the moment of opening or while the plate is being rinsed by the spray nozzles 11.

Also, the bending of the obturating plate has a stiffening effect on this surface, thus avoiding distortions under the weight of the liquid present in the apparatus.

The upper face of the plate, oriented upwards, comprises a resilient coating 20, made of rubber or soft plastic, or the like, having a substantial thickness.

This coating is provided for ensuring at the time of the valve closing, a proper contact between the more or less plane surface of plate 5 and the edges of the tube 17, as the flexibility of the material allows it to become crushed and to stretch against the edges under the closing pressure exerted by the jack.

The coating is held in place on the plate by two releasable fasteners 21, 22 located on the bent edges 15 and 16 on opposite ends of the plate, this arrangement allowing the coating to be resiliently deformed and also to be replaced when worn out.

Also, the use of such a coating protects the metal surface against corrosion.

The plate further comprises rollers 23 for horizontal displacements. These rollers are movable along rolling and guiding rails 24. These are rolling rails inasmuch as they represent an horizontally fixed support for the rollers; they are guiding rails as they maintain the direction of displacement of the plate relatively to the outflow seat section 3, which cannot deviate during its displacement.

Rails 24 are motion less relatively to the outflow seat section 3 and in the illustrated example they are rigidly fixed to the discharge tube 17.

I claim:

1. A valve arrangement, comprising:
an outflow seat section defined by at least a tubular side wall, said outflow seat section having a free end with an engaging part extending along the entire periphery of the side wall,
said engaging part being adapted for close engagement with an engaging surface of a movable obturating plate,
said engaging surface being substantially parallel to a plane of said engaging part and remains substantially parallel to said plane during movement of the obturating plate toward and from said free end of the outflow seat section,
whereby during operation of the valve arrangement said engaging surface of the obturating plate simultaneously engages the entire plane of the engaging part of the outflow seat section causing closing of the valve arrangement, while simultaneously and proportionately moving and spacing the obturating plate away from the entire plane of the engaging part of the outflow seat section during movement of the obturating plate by operating means so as to permit cleaning means to be activated to clean the entire face of the obturating plate when it has moved proportionately away from the entire plane of the outflow seat section.

2. A valve arrangement according to claim 1, wherein said plane of the engaging part of the outflow seat section is positioned at an angle to a longitudinal axis of the outflow seat section.

3. A valve arrangement according to claim 1, wherein said engaging surface of the movable obturating plate is positioned at said angle to a longitudinal axis of the obturating plate.

4. A valve arrangement according to claim 3, wherein the angle is within the range of 3°-30°.

5. A valve arrangement according to claim 1, wherein moving means is provided for moving said obturating plate.

6. A valve arrangement according to claim 5, wherein said moving means is a pneumatic jack connected to the obturating plate.

7. A valve arrangement according to claim 1, wherein said cleaning means comprises a liquid feed line provided with at least one spray nozzle arrangement so as to spray the liquid on the obturating plate.

8. A valve arrangement according to claim 7, wherein said nozzle means sprays the liquid when said obturating plate is in the most remote position from the outflow seat section.

9. A valve arrangement according to claim 8, further coprising a sensor for detecting the contact between the engaging part of the outflow seat section and the engaging surfaces of the movable obturating plate in an open position of the valve arrangement, said sensor being connected to the liquid feed line of said nozzle means, so that when the valve arrangement is open, a jet of the liquid flashes at least the engaging surface of the obturating plate.

10. A valve arrangement according to claim 1, wherein the obturating plate has a front rim and side edges, said rim and side edges being bent substantially upwardly.

11. A valve arrangement according to claim 1, wherein at least a part of the engaging surface of the obturating plate is covered by a resilient coating.

12. A valve arrangement according to claim 11, wherein said resilient coating is made of a rubber or similar material.

13. A valve arrangement according to claim 11, wherein said resilient material is positioned along the front and rear edges.

14. A valve arrangement according to claim 1, wherein said obturating plate has a plurality of moving rollers for moving the obturating plate along guiding rails, said guiding rails being positioned stationary relative to the outflow seat section.

15. A valve arrangement according to claim 1, wherein during operation of the valve arrangement said engaging surface of the obturating palte simultaneously disengages the entire plane of the engaging part causing opening of the valve arrangement.

16. A valve arrangement according to claim 1, wherein said outflow seat section is a gravity operated draining member.

17. A valve arrangement according to claim 1, wherein said tubular side wall of the outflow seat section has inside and outside parts, said engaging part of the outflow seat section extends along the periphery of the side wall between said inside and outside parts.

* * * * *